(12) United States Patent
Godart et al.

(10) Patent No.: US 11,434,149 B2
(45) Date of Patent: Sep. 6, 2022

(54) PRESSURE-DRIVEN TREATMENT OF FLUID

(71) Applicant: Massachusetts Institute of Technology, Cambridge, MA (US)

(72) Inventors: Peter Godart, Cambridge, MA (US); Douglas P. Hart, Charlestown, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 369 days.

(21) Appl. No.: 16/548,137

(22) Filed: Aug. 22, 2019

(65) Prior Publication Data

US 2021/0053847 A1    Feb. 25, 2021

(51) Int. Cl.
*B01D 61/02* (2006.01)
*C02F 1/44* (2006.01)
(Continued)

(52) U.S. Cl.
CPC ............ *C02F 1/441* (2013.01); *B01D 61/025* (2013.01); *B01D 61/10* (2013.01); *F24V 30/00* (2018.05);
(Continued)

(58) Field of Classification Search
CPC ........... B01D 2315/14; C02F 2201/009; C02F 2301/066; F24V 30/00
See application file for complete search history.

(56) References Cited

U.S. PATENT DOCUMENTS 3,565,256 A * 2/1971 Loeffler ................. B01D 61/20
                                                    210/232
4,341,629 A    7/1982 Uhlinger
(Continued)

FOREIGN PATENT DOCUMENTS

WO    WO 2008/060435    5/2008
WO    WO 2015/171687    11/2015
(Continued)

OTHER PUBLICATIONS

Boyd, Jade, "Engineers boost output of solar desalination system by 50%", https://phys.org/news/2019-06-hot-efficiency-solar-desalination.html Jun. 18, 2019, 4 Pages.
(Continued)

*Primary Examiner* — Bradley R Spies
(74) *Attorney, Agent, or Firm* — Wolf, Greenfield & Sacks, P.C.

(57) ABSTRACT

The devices, systems, and methods of the present disclosure are generally directed to using an increase in gas pressure (e.g., through an increase in heat) to move an actuator that at least partially defines a volume containing a feed fluid in fluid communication with a membrane. As the increase in gas pressure moves the actuator, pressure on the feed fluid in the volume may increase beyond a threshold pressure sufficient to move the feed fluid through the membrane. Movement of the feed fluid through the membrane may reduce a volumetric concentration of one or more components of the feed fluid to form a permeate. For example, the increase in pressure may drive the actuator to increase pressure on salt-water in the volume and, ultimately, move the salt-water through the membrane to form the permeate as part of a reverse osmosis process achieved without the use of a mechanical pump.

18 Claims, 9 Drawing Sheets

(51) Int. Cl.
 C02F 103/08 (2006.01)
 F24V 30/00 (2018.01)
 B01D 61/10 (2006.01)
(52) U.S. Cl.
 CPC ...... B01D 2315/14 (2013.01); C02F 2103/08 (2013.01); C02F 2201/009 (2013.01); C02F 2301/066 (2013.01)

(56) References Cited

U.S. PATENT DOCUMENTS

| | | | | |
|---|---|---|---|---|
| 4,388,965 | A * | 6/1983 | Cunningham | G05D 23/192 165/185 |
| 5,685,980 | A * | 11/1997 | Patapoff | B01D 61/08 210/244 |
| 6,299,766 | B1 | 10/2001 | Permar | |
| 2017/0259212 | A1* | 9/2017 | Pierson | B01D 65/02 |
| 2018/0085717 | A1 | 3/2018 | Ermatov et al. | |
| 2020/0199728 | A1 | 6/2020 | Slocum | |

FOREIGN PATENT DOCUMENTS

| | | |
|---|---|---|
| WO | WO 2015/184252 | 12/2015 |
| WO | WO 2016/115031 | 7/2016 |
| WO | WO 2017/146974 | 8/2017 |

OTHER PUBLICATIONS

International Search Report and Written Opinion for PCT/US2020/046759 dated Nov. 18, 2020.
PCT/US2020046759, Nov. 18, 2020, International Search Report and Written Opinion.

\* cited by examiner

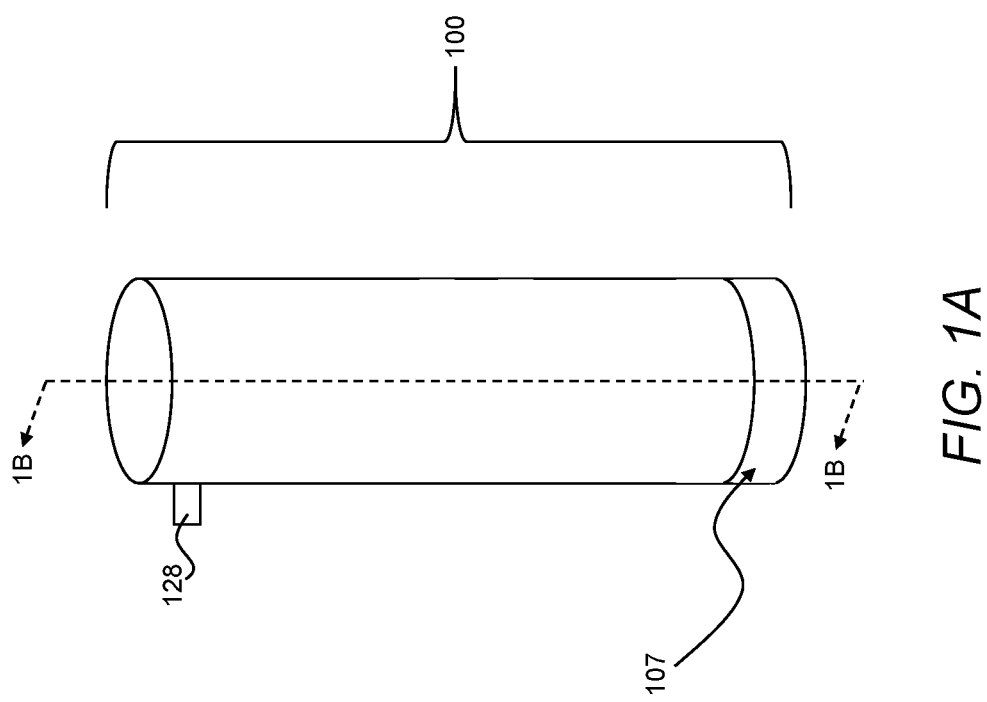

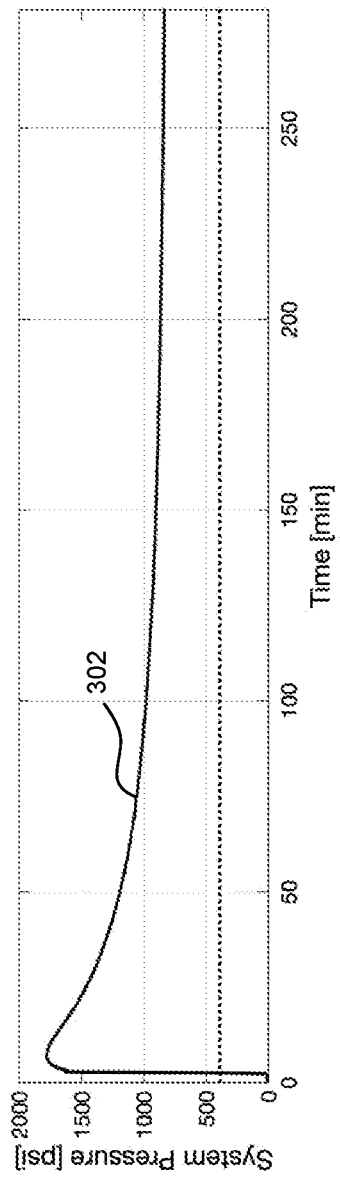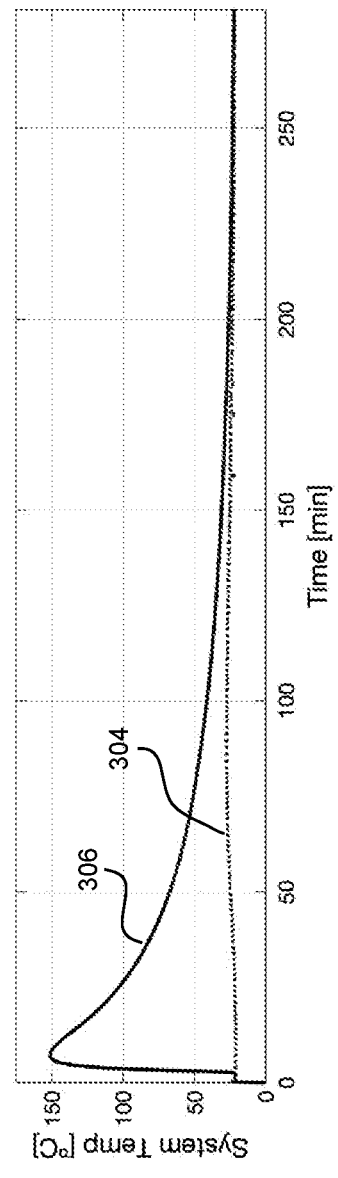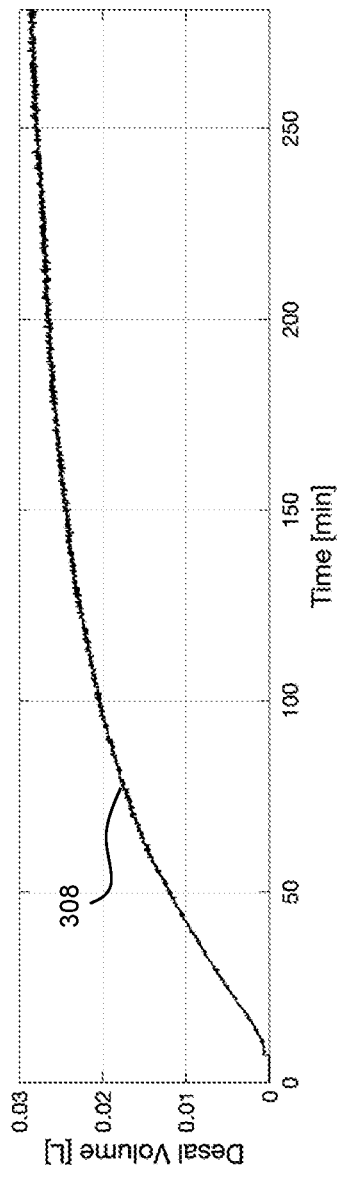
FIG. 3A
FIG. 3B
FIG. 3C

PRESSURE-DRIVEN TREATMENT OF FLUID

GOVERNMENT SPONSORSHIP

This invention was made with government support under FA8721-05-C-0002 awarded by the U.S. Air Force. The government has certain rights in the invention.

TECHNICAL FIELD

The disclosure generally relates to pressure-driven treatment of fluid.

BACKGROUND

Treatment of fluids commonly requires moving a feed fluid through a membrane to reduce or eliminate the presence of at least one component in a permeate. In many applications, mechanical pumps are used to achieve the high pressures required to move the feed fluid through the membrane to achieve a suitable permeate. Such reliance on mechanical pumps and other similar equipment, however, limits the availability of chemical separation techniques to areas with suitable resources.

As an example, in emergency response or disaster relief scenarios along coastal regions, supplies of drinking water can become interrupted while salt-water remains ubiquitous. In these scenarios, until a regular supply of drinking water is restored, it can be desirable to form drinking water locally from salt-water by mechanically pumping the salt-water through a semipermeable membrane in a reverse osmosis process. Without the availability of mechanical pumps, however, the treatment of salt-water to form drinking water through reverse osmosis is unachievable, leaving emergency provision of drinking water to less-effective methods (e.g., distribution of packaged water by air-drops or emergency relief personnel navigating impacted terrain). The result is often local shortages of drinking water in areas that are resource-constrained following a catastrophic event.

Accordingly, there remains a need for membrane-based techniques for treating fluids, without the use of mechanical pumps.

SUMMARY

The devices, systems, and methods of the present disclosure are generally directed to using an increase in gas pressure (e.g., through an increase in heat) to move an actuator that at least partially defines a volume containing a feed fluid in fluid communication with a membrane. As the increase in gas pressure moves the actuator, pressure on the feed fluid in the volume may increase beyond a threshold pressure sufficient to move the feed fluid through the membrane. Movement of the feed fluid through the membrane may reduce a volumetric concentration of one or more components of the feed fluid to form a permeate. For example, the increase in pressure may drive the actuator to increase pressure on salt-water in the volume and, ultimately, move the salt-water through the membrane to form the permeate as part of a reverse osmosis process achieved without the use of a mechanical pump.

According to one aspect, a method of treating a feed liquid may include directing the feed liquid into a first volume defined by a first chamber and a first section of an actuator, increasing pressure of a gas in a second volume defined by a second chamber and a second section of the actuator, the increase in pressure of the gas in the second volume moving the second section to increase a size of the second volume, and translating, via the actuator, the increase in the second volume into movement of the first section, the movement of the first section decreasing the first volume to move the feed liquid through a membrane of the first chamber to form a permeate.

In certain implementations, a first volumetric concentration of salt in the feed liquid in the first volume may be greater than a second volumetric concentration of salt in the permeate.

In some implementations, a total of the first volume and the second volume may be constant as the first volume decreases and the second volume increases.

In certain implementations, the first volume may be a closed volume below a threshold pressure associated with initially moving the feed liquid through the membrane to form the permeate. For example, the feed liquid may be directed into the first chamber at a pressure in the first volume below the threshold pressure.

In some implementations, increasing pressure of the gas in the second volume may include heating the gas in the second volume. Heating the gas in the second volume may include, for example, forming the gas in an exothermic reaction of reactants in the second volume. Additionally, or alternatively, formation of the gas in the exothermic reaction of the reactants in the second volume may have a total heat release time, movement of the feed liquid through the membrane of the first chamber to form the permeate may have a desalination time, and a difference between the desalination time and the total heat release time may be less than about 50 percent of the desalination time. Further, or instead, the reactants may include water and a metal. The metal may include, for example, aluminum. Forming the gas in the exothermic reaction may, in some instances, include reacting the water and the aluminum in the presence of gallium. Additionally, or alternatively, the gas formed in the exothermic reaction of the reactants in the second volume may include hydrogen in a concentration above the upper explosion limit of hydrogen. In some instances, heating the gas in the second volume may include forming the gas through a phase change of a liquid in the second volume. For example, heating the gas in the second volume includes directing solar energy to the liquid in the second volume. The liquid may include, for example, aqueous ammonia.

In certain implementations, the method may, additionally, or alternatively, include flushing the second volume with an inert gas.

In some implementations, the method may, further or instead, include pumping air from the second volume to form a partial vacuum.

According to another aspect, a treatment device may include a first chamber including a membrane, a second chamber, and an actuator having a first section and a second section, the first section and the first chamber defining a first volume, the second section and the second chamber defining a second volume fluidically isolated from the first volume, the second section of the actuator movable relative to the second chamber to increase the second volume, and the first section of the actuator movable relative to the first chamber to decrease the first volume, in response to the increase in the second volume, to move a feed liquid from the first volume through the membrane to form a permeate.

In certain implementations, the actuator may be a piston movable toward the membrane along an axis defined by the first volume.

In some implementations, a total of the first volume and the second volume may be constant as the first section and the second section of the actuator move.

In certain implementations, at least a portion of the second chamber may be opaque. Further, or instead, the treatment device may include aqueous ammonia in the second volume.

In some implementations, the first section of the actuator may be a piston movable relative to the second section of the actuator. For example, the actuator may define a third volume between the piston and the second section, the piston having a first thermal conductivity, the second section having a second thermal conductivity greater than the first thermal conductivity, and the third volume in thermal communication with the second section of the actuator. In certain implementations, the treatment device may include aqueous ammonia in the third volume.

In certain implementations, the treatment device may include a pressure valve in fluid communication with the second chamber. The pressure valve may be, for example, releasable at a first pressure, and the actuator may be movable relative to the second chamber at a second pressure less than the first pressure.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals identify corresponding elements.

FIG. 1A is a perspective view of a treatment device.

FIG. 3A is a temporal profile of pressure in a second volume of the treatment device of FIGS. 1A, 1B, and 1C operated according to the method of FIG. 2, the treatment device operating at a recovery ratio of 0.65 and an efficiency of 120 g of activated aluminum per liter of water desalinated in a reverse osmosis process applied to salt-water having an initial salinity of 3.5 percent.

FIG. 3B is a temporal profile of temperature in the second volume and a temporal profile of temperature in the first volume of the treatment device of FIGS. 1A, 1B, and 1C measured during the reverse osmosis process corresponding to FIG. 3A.

FIG. 3C is a temporal profile of volume of desalinated water moved through a semi-permeable membrane of the treatment device of FIGS. 1A, 1B, and 1C measured during the reverse osmosis process corresponding to FIG. 3A.

Like reference symbols in the various drawings indicate like elements.

DETAILED DESCRIPTION

Figure 1C:
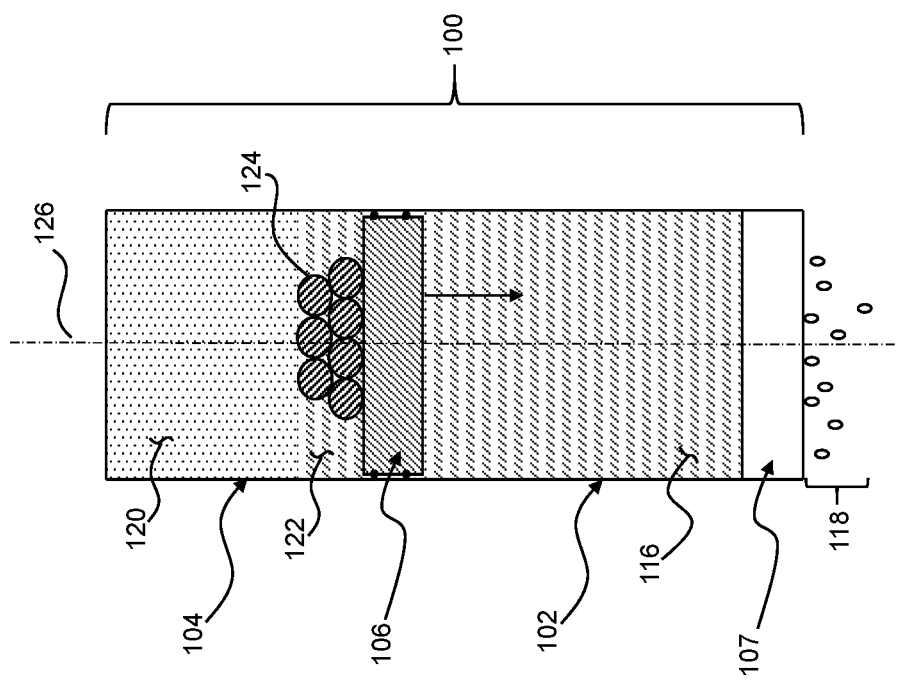
FIG. 1C is the cross-section side view of the treatment device of FIG. 1B, with a feed liquid in a first volume, reactants in a second volume, and a permeate issuing from a membrane.

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, unless otherwise indicated or made clear from the context, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) provided herein, is intended to better describe the embodiments and does not pose a limitation on the scope of the embodiments or the claims. No language in the specification should be construed as indicating any unclaimed element as essential to the practice of the disclosed embodiments.

In the following description, it is understood that terms such as "first," "second," and the like, are words of convenience and are not to be construed as limiting terms, unless specifically stated.

As used herein, the term "treatment" shall be understood to include any process including movement of a feed material through a membrane (e.g., a semipermeable membrane) to form a permeate. Accordingly, to distinguish states of treatment from one another, a feed material or variants thereof (e.g., a feed liquid) shall be understood to refer to a state of flowable media prior to being moved through the membrane. Further, or instead, the term permeate shall be understood to refer to a state of the flowable media following movement of the flowable media through the semipermeable membrane. In certain instances, after the feed material begins moving from a volume, through the membrane, the flowable media remaining in the volume may be referred to as a retentate. In general, a volumetric concentration of one or more components is lower in the permeate than in the feed material and, in turn, the volumetric concentration of these one or more components is lower in the feed material than in the retentate. Unless otherwise indicated or made clear from the context, the term feed material, or variants thereof, may be used interchangeably herein with the term retentate, particularly when either of these terms is being used by itself or in comparison to the permeate. For example, after the start of a process, the feed material remaining in a volume as the process proceeds is a retentate and, thus, the volume may be described as including a feed material or a retentate.

In general, the devices, systems, and methods described herein shall be understood to be applicable to treatment of any of various different types of feed materials, provided that such feed materials are at least flowable. For the sake of efficient and clear explanation, the devices, systems, and methods of the present disclosure are described in the context of treatment of a feed material in the form of a feed liquid. The feed liquid may be a solution, a suspension, a colloid, a dispersion, or any combination thereof, including a liquid media having distributed therein one or more components (e.g., impurities, ions, other unwanted components, or combinations thereof) at least partially removable from the liquid media as the feed liquid moves through the membrane to form the permeate. Additionally, or alternatively, unless otherwise specified or made clear from the context, the devices, systems, and methods of the present disclosure shall be understood to be applicable to feed material having other types of flowable media, examples of which include, but are not necessarily limited to, gases, gels, slurries, or combinations thereof.

Further, for the sake of describing certain aspects of the present disclosure, the examples of treatments described herein generally relate to reverse osmosis batch processes applied to salt-water as the feed liquid to form a permeate, with the permeate having a lower volumetric concentration of salt than the salt-water used as the feed liquid. More generally, however, it shall be understood that the devices, systems, and methods described herein may be applicable to various, different types of treatments that may be advantageously carried out without the use of mechanical pumps.

Figure 1B:
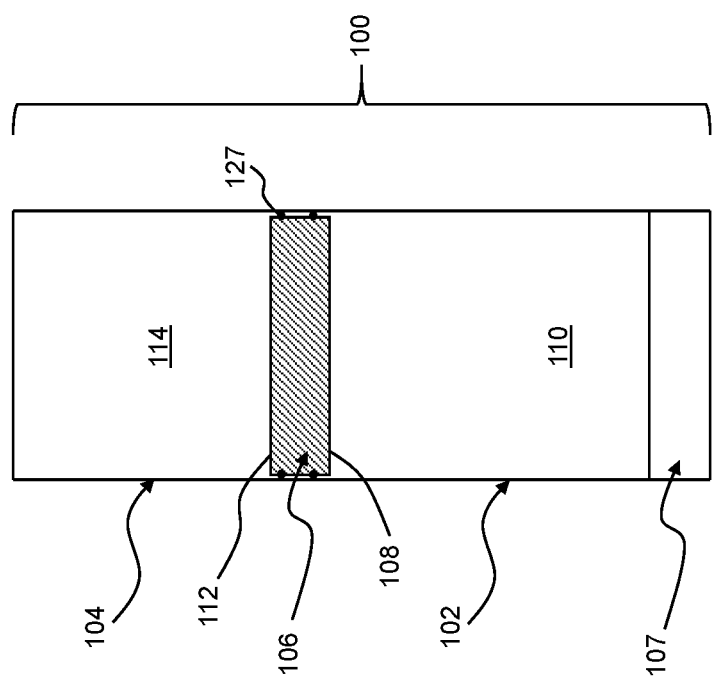
FIG. 1B is cross-sectional side view of the treatment device of FIG. 1A, taken along line 1B-1B in FIG. 1A.

Referring now to FIGS. 1A, 1B, and 1C, a treatment device 100 may include a first chamber 102, a second chamber 104, and an actuator 106. The first chamber 102 and a first section 108 of the actuator 106 may define a first volume 110. The second chamber 104 and a second section 112 of the actuator 106 may define a second volume 114. The actuator 106 may be movable relative to the first chamber 102 and the second chamber 104 to transfer pressure from the second volume 114 to the first volume 110 while maintaining fluid isolation between the first volume 110 and the second volume 114. In turn, the pressure directed to the first volume 110 from the second volume 114 may move a feed liquid 116 from the first volume 110 through a membrane 107 of the first chamber 102 to form a permeate 118. As compared to treatment systems requiring the use of a mechanical pump to move a liquid through a membrane, such pressure-driven treatment using the treatment device 100 may require fewer and less complex moving parts, which may facilitate, among other things, reliable operation after long periods of storage without maintenance.

In use, as described in greater detail below, the pressure used to actuate the treatment device 100 may be generated within the treatment device 100 itself, through an exothermic reaction of at least a first reactant 122 and a second reactant 124 in the second volume 114. For example, the second volume 114 may be a closed volume and the heat release rate of the exothermic reaction may exceed heat flux from the second volume 114 such that the temperature of a gas 120 in the second volume 114 increases as the exothermic reaction proceeds. The increase in temperature of the second volume 114, in turn, causes the pressure of the gas 120 to increase in the second volume 114. In addition to increasing pressure in the second volume 114 by creating heat, the exothermic reaction also produces more moles of the gas 120 in the second volume 114 such that pressure in the second volume 114 also increases through an increase the amount of vapor in the second volume 114. With an increase in pressure sufficient to overcome friction of the actuator 106 and osmotic pressure of the feed liquid 116 in the first volume 110, the second section 112 of the actuator 106 may move relative to the second chamber 104 to produce an increase in the second volume 114. As the second section 112 of the actuator 106 moves to increase the second volume 114, the first section 108 of the actuator 106 may move relative to the first chamber 102 to decrease the first volume 110 and, thus, move the feed liquid 116 through the membrane 107 to form the permeate 118. That is, as described in greater detail below, the treatment device 100 may carry out pressure-driven treatment of the feed liquid 116.

Accordingly, the treatment device 100 may treat the feed liquid 116 using mechanical work produced on-site and on-demand in the treatment device 100 from chemical energy stored stably in the form of the first reactant 122 and the second reactant 124. Thus, as compared to treatment systems requiring the use of electricity to drive a mechanical pump, the treatment device 100 may be a robust solution for treating the feed liquid 116 in emergency scenarios or remote locations in which electrical power is unreliable or unavailable. Further, or instead, as compared to treatment systems making use of battery or generator power to drive a mechanical pump, generating pressure directly from the exothermic reaction of the first reactant 122 and the second reactant 124 in the treatment device 100 may facilitate improved efficiency with respect to the overall size and weight of materials required to form a given volume of the permeate 118.

In general, a total of the first volume 110 and the second volume 114 may be constant as the first section 108 and the second section 112 of the actuator 106 move relative to the first chamber 102 and the second chamber 104. For example, as the second volume 114 increases by an incremental volume, the first volume 110 may decrease by an equivalent decremental volume such that the combined size of the first volume 110 and the second volume 114 remains constant. That is, in such instances, the first chamber 102, the second chamber 104, and the actuator 106 may be inflexible in a range of pressures required to move the feed liquid 116 through the membrane 107 to form the permeate 118. Continuing with this example, because work is not absorbed in components defining the first volume 110 and the second volume 114, the constant total of the first volume 110 and the second volume 114 may facilitate efficient transfer of work from the second volume 114 to the first volume. Such efficient transfer of work may be advantageous for achieving an adequate throughout of the feed liquid 116 to form the permeate 118.

Further, or instead, a constant total of the first volume 110 and the second volume 114 may be useful for forming the treatment device 100 with constant overall outer dimensions. More specifically, the constant total volume may facilitate forming the treatment device 100 without external moving parts that may otherwise be required to accommodate changes in total volume. As compared to a treatment system including external moving parts, instances of the treatment device 100 formed without external moving parts may be better suited for reliable operation after exposure to harsh environmental conditions.

The actuator 106 may be generally movable along any one or more of various different paths to transfer work from the second volume 114 to the first volume 110. For example, the actuator 106 may be a piston movable toward the membrane 107 along an axis 126 defined by the first volume 110. As a more specific example, the actuator 106 may include one or more instances of an O-ring 127. The O-ring 127 may fluidically isolate the first volume 110 and the second volume 114 from one another while being in sliding contact with the first chamber 102 and the second chamber 104 such that the actuator 106 is constrained to move only along the axis 126. As compared to other types of movement, movement of the actuator 106 along the axis 126 may be achieved with relatively few moving parts and, thus, may offer advantages with respect to robustness and repeatability. Further, or instead, in comparison to other types of movement of the actuator 106, linear movement of the actuator 106 may facilitate efficient transfer of work from the second volume 114 to the first volume 110 while maintaining fluid isolation between the first volume 110 and the second volume 114.

In general, the membrane 107 of the first chamber 102 may be in any orientation suitable for receiving the feed liquid 116 from the first volume 110. For example, the membrane 107 may be opposite the first section 108 of the actuator 106 along the first volume 110. Such relative positioning of the actuator 106 relative to the membrane 107 may advantageously reduce the likelihood of contact between the actuator 106 and the membrane 107, thus reducing the likelihood of damaging the actuator 106 and/or the membrane 107 as the feed liquid 116 is treated using the treatment device 100. As a more specific example, in instances in which the actuator 106 undergoes linear movement along the axis 126, the membrane 107 may be along the axis 126. As compared to other orientations of the membrane 107 relative to the actuator 106, axial alignment of the membrane 107 relative to the movement of the actuator 106 may result in less energy loss as the actuator 106 acts on the first volume 110 to move the feed liquid 116 through the membrane 107. Further, or instead, as again compared to other orientations of the membrane relative to the actuator 106, axial alignment of the membrane 107 relative to the movement of the actuator 106 may facilitate achieving efficient use of space within a given form factor of the treatment device 100.

The membrane 107 may be any one or more of various different semipermeable membranes suitable for removing one or more components from the feed liquid 116. For example, the membrane 107 may be any one or more of various different off-the-shelf membranes. As may be appreciated, the use of an off-the-shelf component as the membrane 107 may facilitate replacement of the membrane 107 in remote areas without the need for specially trained personnel or a supply of unique components. Additionally, or alternatively, in the context of a treatment including reverse osmosis to desalinate salt-water, the membrane 107 may include, for example, a cross-linked polyamide composite. As a more specific example, based on the use of an off-the-shelf component, the membrane 107 may be a Romebra® Toray RO membrane, available from Toray Industries, Inc., Tokyo, Japan.

In certain instances, the treatment device 100 may include a pressure valve 128 in fluid communication with the second volume 114. The pressure valve 128 may be releasable at a first pressure, and the actuator 106 may be movable relative to the second chamber 104 at a second pressure less than the first pressure. As an example, the pressure valve 128 may be releasable at a first pressure that is greater than about 2,000 psi and less than about 12,000 psi. In certain implementations, the pressure valve 128 may be mounted on the second chamber 104 (e.g., through threaded engagement from an outer surface to an inner surface of the second chamber 104). Additionally, or alternatively, the pressure valve 128 may be removable from the second chamber 104 to facilitate access to the second volume 114 to introduce reactants and/or remove reaction products from the second volume 114, as necessary.

By providing an upper limit of pressure in the second volume 114, the pressure valve 128 may reduce the likelihood of creating an unsafe condition in the second volume 114 as the first reactant 122 and the second reactant 124 react with one another, and possibly additional components, in an exothermic reaction to increase the pressure in the second volume 114. Further, or instead, the pressure valve 128 may be resettable such that the treatment device 100 may remain useable after an uncontrolled heat release in the second volume 114.

Having described features of hardware that may be included in the treatment device 100, attention is now turned to thermal characteristics of the treatment device 100. In general, the thermal characteristics of the treatment device 100 facilitate balancing competing considerations associated with implementing the treatment device 100 in resource-constrained scenarios. More specifically, the thermal characteristics of the treatment device 100 may balance competing considerations associated with achieving suitable throughput the feed liquid 116 to form the permeate 118 while maintaining the size of the treatment device 100 within a volumetric envelope appropriate for a given mission (e.g., personal use, household use, communal use, industrial use).

In general, heat flux from the second volume 114 is inversely related to the efficient use of the first reactant 122 and the second reactant 124. That is, by limiting heat flux from the second volume 114, a large fraction of the heat generated through the exothermic reaction of at least the first reactant 122 and the second reactant 124 in the second volume 114 is transferred into mechanical work used to move the actuator 106 and, by comparison, only a small fraction of the heat is lost as waste heat. Stated differently, under otherwise identical conditions, an adiabatic condition in the second volume 114 represents an ideal limit corresponding to the most efficient use of the first reactant 122 and the second reactant 124 to produce a given volume of the permeate 118. While this ideal condition is unachievable in practice and does not take into account other practical considerations discussed below, it nevertheless suggests that it may be useful to insulate the second volume 114 and/or at least the second section 112 of the actuator 106 to achieve low heat flux from the second volume 114.

In some instances, given that the actuator 106 delineates the first volume 110 from the second volume 114, the actuator 106 may include a thermally insulating material to limit heat loss from the second volume 114 to the first volume 110 during use of the treatment device 100. For example, thermally insulating material suitable for forming the actuator 106 may include any one or more materials having a thermal conductivity less than about 1 W/(m·K). In some implementations, the thermally insulating material may extend from the second section 112 of the actuator 106 to the first section 108 of the actuator 106, which may facilitate forming the actuator 106 as a unitary component capable of withstanding high pressures generated in the second volume 114. In other implementations, however, the thermally insulating material may be disposed along the second section 112 of the actuator 106, and a different material may be disposed along the first section 108 of the actuator. By way of example, and not limitation, the thermally insulating material may include one or more ceramic materials (e.g., glass-mica), capable of withstanding exposure to pressure greater than about 2,000 psi and less than about 12,000 psi.

More generally, the amount of insulation useful in a given implementation of the treatment device 100 may depend on various different practical limitations. For example, beyond a certain amount of insulation, a reduction in heat flux from the second volume 114 may not be practically achievable. That is, beyond a certain point, the use of additional insulation may produce diminishing returns with respect to achieving a reduction in heat flux from the second volume 114. Further, or instead, to the extent insulation adds size and/or weight to the treatment device 100, the mission associated with the treatment device 100 may represent a practical limit to the amount of insulation that may be used. Additionally, or alternatively, the second chamber 104 may require accessibility between uses of the treatment device 100 such that the first reactant 122 and the second reactant may be replenished and reaction products may be removed. For example, the first chamber 102 may be in threaded engagement with the second chamber 104 such that the first chamber 102 and the second chamber 104 may be decoupled from one another as necessary for adding or removing materials and/or for replacing one or more components. Such accessibility, however, is generally associated with a trade-off with respect to the ability insulate the second volume 114. For example, seals or other physical interfaces useful for accessibility may be difficult to insulate and, thus, may be associated with high amounts of heat flux from the second volume 114.

Having described features of the treatment device 100, attention is now turned to the reactants useful for generating pressure in the second volume 114 to drive treatment of the feed liquid 116 through the membrane 107 to form the permeate 118. While reactants have been described as the first reactant 122 and the second reactant 124, it should be appreciated that one or more additional materials may be introduced into the second volume 114 during initial set-up of the treatment device 100. For example, one or more additional materials may be present in the second volume 114 to slow a reaction rate of the first reactant 122 and the second reactant 124 and, thus, facilitate achieving a total heat release time that is compatible with a time associated with moving the feed liquid 116 through the membrane 107 to form the permeate 118.

In certain implementations, the first reactant 122 and the second reactant 124 may include a fuel and an oxidizer. While the oxidizer may include ambient oxygen in some instances, it should be appreciated that other types of oxidizers may be used. More specifically, water may be used as an oxidizer in many instances. In the context of certain reactions, such as those described in greater detail below, the use of water as an oxidizer may reduce or eliminate the need for a separate energy source (e.g., a spark) to initiate a reaction. Further, or instead, as compared to ambient oxygen, the introduction of an appropriate amount of water into the second volume 114 may be more easily controlled.

As an example, the first reactant 122 may include water (e.g., salt-water) as an oxidizer and the second reactant 124 may include a metal as a fuel. This may be particularly useful, for example, in instances in which the treatment device 100 is used to carry out reverse osmosis to desalinate salt-water. In such instances, the salt-water may serve as both the first reactant 122 in the second volume 114 and as the feed liquid 116 undergoing treatment in the first volume 110. Thus, continuing with this example, with a ubiquitous source of salt-water (e.g., along coastal regions) as the first reactant 122 and the feed liquid 116, the second reactant 124 is the only resource that needs to be specifically distributed and stored to carry out the reverse osmosis desalination using the treatment device 100.

The water of the first reactant 122 and the metal of the second reactant 124 may react to produce hydrogen, a metal hydroxide, and heat in an exothermic reaction. As may be appreciated, such a reaction is hindered by an oxide layer that readily forms to make the metal non-reactive in the presence of water. Thus, stated differently, the reaction of water and metal may require the use of a metal that has been treated to de-passivate the oxide layer that would ordinarily exist on the metal in the absence of de-passivation.

As an example, the metal of the second reactant 124 may include aluminum. More specifically, the aluminum may be an activated aluminum fuel treated with at least gallium (and, additionally or alternatively, indium) to de-passivate an oxide layer that would ordinarily form on the aluminum. This activated aluminum fuel is water-reactive as follows:

$$2Al+4H_2O \rightarrow 3H_2+2AlOOH+Heat$$

Thus, notably, the products of this reaction include heat, aluminum hydroxide, and hydrogen. As described throughout this disclosure, the heat is useful for creating pressure in the second volume 114 to drive the actuator 106 toward the first volume 110. Aluminum hydroxide is a stable and safe material that may be handled without any special equipment, and does not pose any significant environmental risks. As may be appreciated, hydrogen may be explosive under certain conditions. However, as described in greater detail below, the exothermic reaction of water and activated aluminum in the second volume 114 may be controlled such that conditions in the second volume 114 may be above the explosion limit of hydrogen. In certain instances, the hydrogen formed in the second volume may be used as a secondary fuel source, such as may be useful to power a fuel cell. Further details of activated aluminum fuel suitable for use in the treatment device 100 are described in U.S. Pat. App. Pub. 20160355918, published on Dec. 8, 2016, and entitled "Activated Aluminum Fuel," the entire contents of which are hereby incorporated herein by reference.

The activated aluminum may be particularly useful for use as the second reactant 124 at least because it has a high energy density (83.8 MH/L) compared to many other metals. Further, or instead, the activated aluminum may be formed from scrap aluminum, thus making the activated aluminum cost effective to produce. Still further, or in the alternative, the activated aluminum may remain stable for long periods of time, making it suitable for storage requirements associated with emergency use.

Having described aspects of the treatment device 100 and the reactants that may be used with the treatment device 100, attention is now turned to methods of treating a feed liquid using, for example, the treatment device 100.

Figure 2:
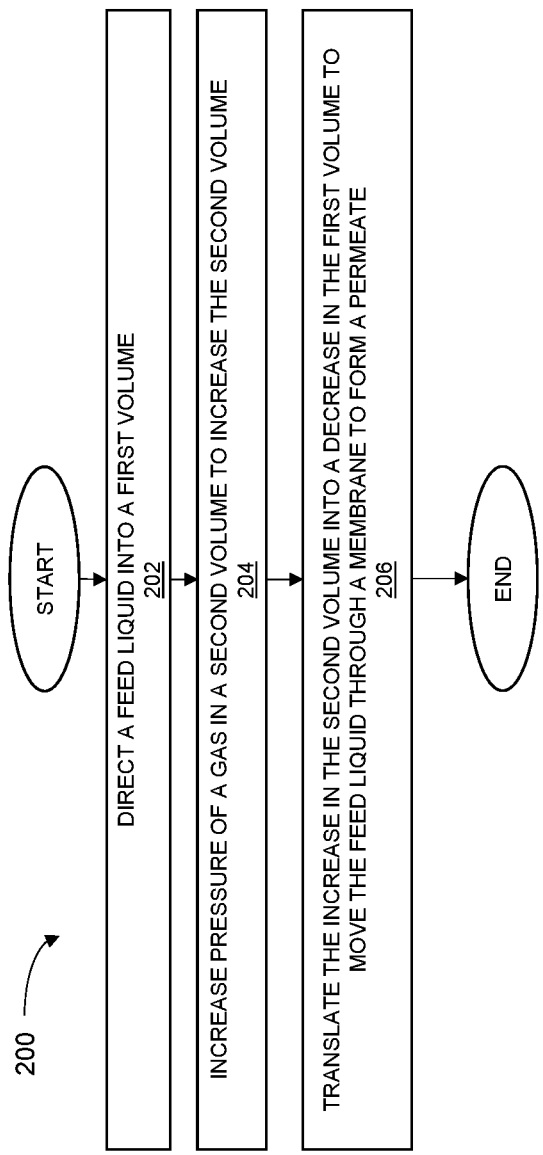
FIG. 2 is a flow chart of an exemplary method of treating a feed liquid.

FIG. 2 is a flow chart of an exemplary method 200 of treating a feed liquid. It should be appreciated that the exemplary method 200 may be carried out, for example, by any one or more of the treatment devices (e.g., the treatment device 100) described herein to treat any one or more of the feed liquids (e.g., the feed liquid 116) described herein to form any one or more of the permeates (e.g., the permeate 118) described herein.

As shown in step 202, the exemplary method 200 may include directing a feed liquid into a first volume defined by a first chamber and a first section of an actuator. The first chamber may include a membrane at least partially defining the first volume, and the feed liquid may be directed into the first volume at a pressure below a threshold pressure associated with initially moving the feed liquid through the membrane. That is, below the threshold pressure, the first volume may be a closed volume such that the feed liquid directed into the first volume initially remains in the first volume as the treatment device is being set up to carry out treatment of the feed liquid. As pressure in the first volume is increased beyond this initial threshold pressure the feed liquid may begin to move through a membrane to form a permeate. As described in greater detail below, as the feed liquid moves through the membrane to form the permeate, additional pressure is required to be exerted on the feed liquid to overcome the increase in osmotic pressure that may occur as the feed liquid is moved through the membrane to form the permeate.

In general, the feed liquid may be directed into the first volume using any one or more of various different techniques associated with moving water into a volume. Thus, for example, directing the feed liquid into the first volume in this manner may include, for example, pouring the feed liquid into the first volume through an inlet. Further, or instead, directing the feed liquid into the first volume may include moving the feed liquid into the first volume under the force of gravity.

In certain instances, the feed liquid that is directed into the first volume may be pretreated to reduce the likelihood of contaminating one or more components of a treatment device used to carry out the exemplary method 200. For example, in instances in which the feed liquid is salt-water, the feed liquid may be passed through at least one strainer to remove relatively large suspended materials (e.g., sand, seaweed, or other solids) that may contribute to rapid degradation of the membrane or other components of the treatment device.

As shown in step 204, the exemplary method may include increasing pressure of a gas in a second volume defined by a second chamber and a second section of the actuator. In turn, the increase in pressure of the gas in the second volume may move the second section of the actuator to increase a size of the second volume. To the extent the increase in pressure of the gas in the second volume originates within the second volume, without the use of a mechanical component such as a pump to act on the second volume, the movement of the actuator in response to the increased pressure in the second volume shall be understood to be pressure-driven. In general, the actuator may be pressure-driven according to any one or more of the various different techniques described herein.

As an example, the actuator may be pressure-driven by heating the gas in the second volume according to any one or more of the various different heating approaches described throughout this disclosure. Thus, heating the gas in the second volume may include forming and/or heating the gas in an exothermic reaction of reactants in the second volume. That is, continuing with this example, the reactants may be introduced into the second volume as part of setting up a batch treatment process. With the reactants in the second volume, the second volume may be closed (e.g., through threaded engagement between the first chamber and the second chamber) or otherwise adjusted such that a significant fraction of heat generated through the exothermic reaction expands the gas and, ultimately, manifests as pressure exerted on the actuator. More generally, as described in greater detail below, the total heat release time associated with the exothermic reaction may be directly or indirectly controlled such that the actuator may be pressure-driven over an amount of time at least partially dictated by a time-scale associated with treating the feed liquid.

In implementations in which the actuator is pressure-driven through an exothermic reaction in the second volume, the reactants for the exothermic reaction may include any one or more of the various different reactants described herein. For example, the reactants may include activated aluminum and salt-water. As described above, this combination of reactants may be well-suited to implementations in which the exemplary method 200 is carried out in the context of reverse osmosis to desalinate salt-water. Further, or instead, as also described above, activated aluminum is an energy dense fuel. Thus, as compared to other types of fuels, a smaller volume of activated aluminum may be used to treat a given volume of salt-water. This, too, may be useful in resource-constrained scenarios as it may facilitate more efficient use of space for storing materials needed to carry out the exemplary method 200 to desalinate water.

In some implementations, the activated aluminum may include aluminum de-passivated with at least gallium and/or indium, as described above. For example, the activated aluminum may include indium and/or gallium wetted along grain boundaries of an aluminum object, as described in U.S. Pat. App. Pub. 20160355918. Under otherwise identical conditions, such a distribution of gallium and/or indium wetted along grain boundaries of the aluminum object may increase the total heat release time of the activated aluminum as it is exposed to salt-water. That is, the time required for the salt-water to diffuse along the wetted grain boundaries, where the aluminum is de-passivated by the gallium and/or indium, may limit the amount of activated aluminum reacting with the water at any given time and, thus, may increase the total amount of time required to release heat from the activated aluminum. As described in greater detail below, under otherwise identical conditions, exerting pressure on the actuator over a longer period of time may be useful for achieving more efficient use of the activated aluminum fuel to form a permeate.

In certain implementations, the conditions associated with the exothermic reaction in the second volume may be controlled to reduce the likelihood of forming explosive or otherwise hazardous conditions in the second volume. For example, the second volume may be initially purged of oxygen (e.g., by flushing the second volume with an inert gas, such as nitrogen, by pumping air from the second volume to form at least a partial a vacuum in the second volume, or a combination thereof) to reduce the likelihood of forming an explosive environment in which oxygen and one or more reaction products react in the second volume. In particular, returning to the example in which the reactants are activated aluminum and water, the exothermic reaction in the second volume may be controlled such that the gas formed in the second volume includes hydrogen in a concentration above the upper explosion limit of hydrogen. At such concentrations, hydrogen may be stable in the second volume and safely handled through controlled release from the second volume (e.g., to a fuel cell or other similar power generation device operable using hydrogen as a fuel). Further or instead, as discussed above, the second volume may include a pressure valve to reduce the likelihood of damage in the event that an explosive condition is inadvertently formed in the second volume.

As shown in step 206, the exemplary method 200 may include translating, via the actuator, the increase in the second volume into a decrease in the first volume. That is, as the second section of the actuator moves to increase the size of the second volume in response to pressure in the second volume, the first section of the actuator may undergo corresponding movement to decrease the first volume to move the feed liquid through the membrane to form the permeate. In certain implementations, the first section of the actuator and the second section of the actuator may be directly coupled, which may facilitate transferring pressure in a relatively compact size envelope and using a small number of moving parts. However, in some implementations described below, the first section of the actuator and the second section of the actuator may be indirectly coupled, as may be useful for controlling the heat release time relevant to the treatment time to achieve efficient use of fuel.

In general, the membrane may separate at least a portion of one or more components from the feed liquid moving through the membrane such that, as compared to the feed liquid, the permeate may have a lower volumetric concentration of one or more components. This difference in concentration of one or more components across the membrane creates a condition in which the permeate has a tendency to move back through the membrane to establish equilibrium of the one or more components across the membrane. As used herein, osmotic pressure shall be understood to correspond to a minimum pressure needed to be exerted on the feed liquid in the first volume to prevent the permeate from flowing back across the membrane to establish equilibrium of the one or more components across the membrane.

As more feed liquid moves through the membrane, the difference in volumetric concentrations of the one or more components in the feed liquid and the permeate increases. In turn, the osmotic pressure also increases. Thus, in the context of reverse osmosis to desalinate salt-water, a first volumetric concentration of salt in the salt-water remaining in the first volume (the retentate) may be greater than a second volumetric concentration of salt in the permeate. As more salt-water moves through the membrane, the volumetric concentration of the salt in the retentate increases over time. In turn, as the volumetric concentration of the salt in the retentate increases, the osmotic pressure also increases. Accordingly, as this example demonstrates, as long as the pressure produced in the second volume and translated to the first volume remains above the osmotic pressure, the treatment of the feed liquid to form the permeate may continue. Similarly, as the pressure produced in the second volume and translated to the first volume becomes equal to the osmotic pressure, the treatment of the feed liquid to form the permeate stops.

As used herein, the term recovery ratio refers to a ratio of the volume of the permeate to the volume of the feed liquid used to produce the permeate. Thus, the foregoing discussion of changing osmotic pressure may be expressed in terms of recovery ratio. Specifically, under otherwise identical conditions, achieving a higher recovery ratio (getting more permeate out of the first volume) requires overcoming higher osmotic pressure. Thus, in instances in which pressure in the first volume is generated from an exothermic reaction in the second volume, it should be appreciated that more fuel is generally required to achieve higher recovery ratios. Because the amount of fuel used in a given treatment contributes to the overall size of the treatment device, it should be appreciated that the recovery ratio of a given treatment may be influenced by considerations associated with portability or other mission considerations of the treatment device.

In view of the foregoing physical limitations, as well as constraints related to the availability of fuel in many use cases, efficient use of fuel to form a given volume of permeate is important, if not critical, in many applications. As discussed above, under otherwise identical conditions, some efficiency gains may be achieved through insulation to limit the amount of fuel energy ultimately lost as heat flux from the second volume. However, because reactions of fuels, such as activated aluminum, are highly exothermic and energetic, the time scale for reaction is typically significantly shorter than the time scale associated with treating the feed liquid (e.g., through reverse osmosis). Keeping the treatment device well insulated during the period following the total heat release time and the time required to treat the feed liquid can be difficult, and often impractical, for many use cases. Thus, in certain implementations, it may be advantageous to control the rate of reaction of reactants in the second volume to achieve improved efficiency in the mass of fuel required to form a given volume of permeate. In particular, controlling the rate of reaction of reactants in the second volume may increase the total heat release time associated with the exothermic reaction. Improved efficiency of fuel use may be realized as the total heat release time approaches the time required to treat the feed liquid. Thus, for example, formation of the gas in the exothermic reaction of reactants in the second volume may have a total heat release time, movement of the feed liquid through the membrane of the to form the permeate may have a treatment time (e.g., a desalination time in the context of reverse osmosis for desalination of salt-water), and a difference between the treatment time and the total heat release time is less than about 50 percent of the treatment time.

The following experiments describe the use of a treatment device to carry out batch reverse osmosis of salt-water in accordance with the exemplary devices, systems, and methods described herein with respect to FIGS. 1A, 1B, 1C, and 2. That is, the treatment device used in the following experiments corresponds to the general configuration—in prototype form—of the treatment device 100 shown in FIGS. 1A, 1B, and 1C, unless otherwise specified or made clear from the context. Further, it is to be understood that these experiments and corresponding results are set forth by way of example only, and nothing in these examples shall be construed as a limitation on the overall scope of this disclosure.

Referring now to FIGS. 3A, 3B, and 3C, a treatment device corresponding to FIGS. 1A, 1B, and 1C was operated according to the exemplary method 200 (FIG. 2) to desalinate salt-water having a starting salinity of 3.5 percent by volume, with the treatment device operated at a recovery ratio of 0.65 with an efficiency of 120 g of activated aluminum per liter of water desalinated. In FIG. 3A, a pressure profile 302 is shown as a function of a treatment time required to desalinate the salt-water. In FIG. 3B, a first temperature profile 304 and a second temperature profile 306 are shown as a function of the treatment time, with the first temperature profile 304 representing temperature in the first volume and the second temperature profile 306 representing the temperature in the second volume as the desalination process proceeds. In FIG. 3C, a volume profile 308 of water treated is shown as a function of the treatment time.

As may be appreciated from a comparison of FIGS. 3A, 3B, and 3C, the pressure and temperature rise associated with heat release from the exothermic reaction of activated fuel in the second volume is much shorter than the time required to desalinate water. This difference in time-scales demonstrates an important challenge related to efficient use of activated aluminum fuel to desalinate salt-water using the treatment device. In particular, in an initial portion of the process, the heat generated by the exothermic reaction in the second volume far exceeds the amount of energy required to move the salt-water through the membrane. This excess heat becomes wasted energy, escaping as heat flux from the second volume before it can be translated, via the actuator, into useful work performed on the salt-water feed liquid in the first volume to move the salt-water feed liquid through the membrane. Thus, in certain implementations it may be useful to reduce this difference in time scales—namely, the difference in total time for heat release relative to the time required to move the feed liquid through the membrane—to achieve more efficient use of activated aluminum fuel.

Referring now specifically to FIG. 3B, it may be appreciated from a comparison of the first temperature profile 304 to the second temperature profile 306, that relatively little heat formed in the second volume is transferred to the first volume as the desalination process proceeds. That is, as the second temperature profile 306 demonstrates a large change in temperature in the second volume over the course of the desalination process, the first temperature profile increases only modestly over the course of the desalination process. This suggests that the first volume is well insulated from the heat released in the second volume. More specifically, this suggests that the actuator in the prototype treatment device is well-insulated and, as such, does not form a substantial pathway of heat flux from the second volume.

In a separate experiment, a treatment device corresponding to FIGS. 1A, 1B, and 1C was used to carry out four different batch processes according to the treatment described with respect to FIG. 2. In each batch process, salt-water with a starting salinity of 3.5 percent by volume was a starting material in a first volume. Pressure in a second volume was created through an exothermic reaction of activated aluminum and salt-water in the second volume. The pressure from a second volume was translated to the first volume, via an actuator, to move the salt-water through a semi-permeable membrane to form a fresh water permeate. While the salt-water, activated fuel, and initial conditions were nominally identical, slight variations in each of these at least partially contributed to differences in performance of the treatment device.

Figure 4:
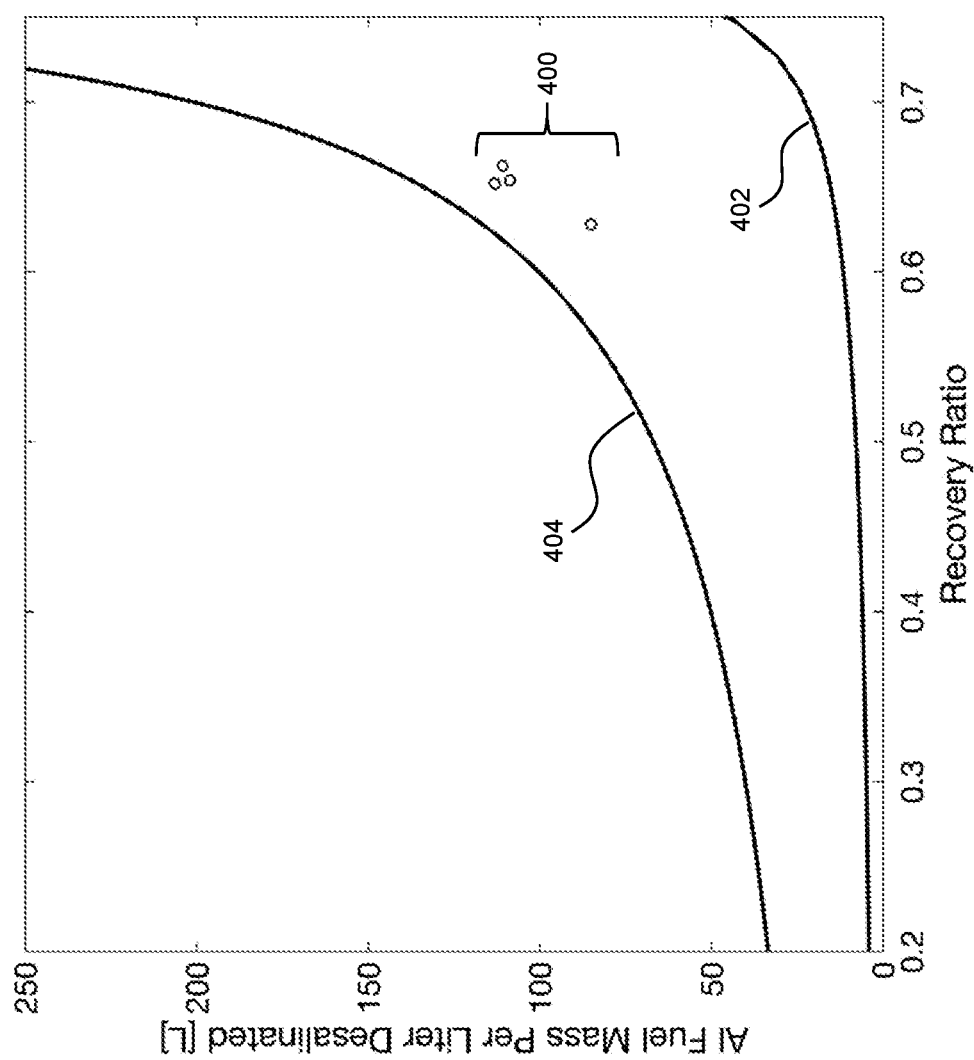
FIG. 4 is a graph of aluminum fuel mass per liter of desalinated water as a function of recovery ratio for the treatment device of FIG. 1A operated according to the method of FIG. 2 for desalination of salt-water in a reverse osmosis process driven by pressure created through exothermic reaction of activated aluminum and salt-water.

Referring now to FIG. 4, the treatment device used to carry out the four batch processes is characterized according to the mass of aluminum required to desalinate a liter water for each batch process. At a given recovery ratio, using a lower mass of activated aluminum to desalinate a liter of water represents a more efficient use of the energy in the activated aluminum fuel. In turn, more efficient use of the activated aluminum may be particularly useful for certain missions, such as personal or household use, in which carrying and/or storing large amounts of activated aluminum may not be practical.

In FIG. 4, measured efficiency data 400 are shown relative to a first efficiency curve 402 and a second efficiency curve 404. The first efficiency curve 402 is based on a thermal model in which the treatment device is assumed to be perfectly insulated and the actuator is assumed to expand until just before steam in the second volume condenses. Accordingly, the first efficiency curve 402 should be understood to be an upper theoretical bound of efficiency for the treatment device. The second efficiency curve 404 is based on a thermal model in which heat flux from the second volume is not restricted by insulation. Accordingly, the second efficiency curve 404 should be understood to be a lower theoretical bound of efficiency for the treatment device. As indicated by a comparison of the measured efficiency data 400 to the first efficiency curve 402 and to the second efficiency curve 404, the treatment device exhibited a large amount of thermal loss in each of the four batch processes.

Figure 5:
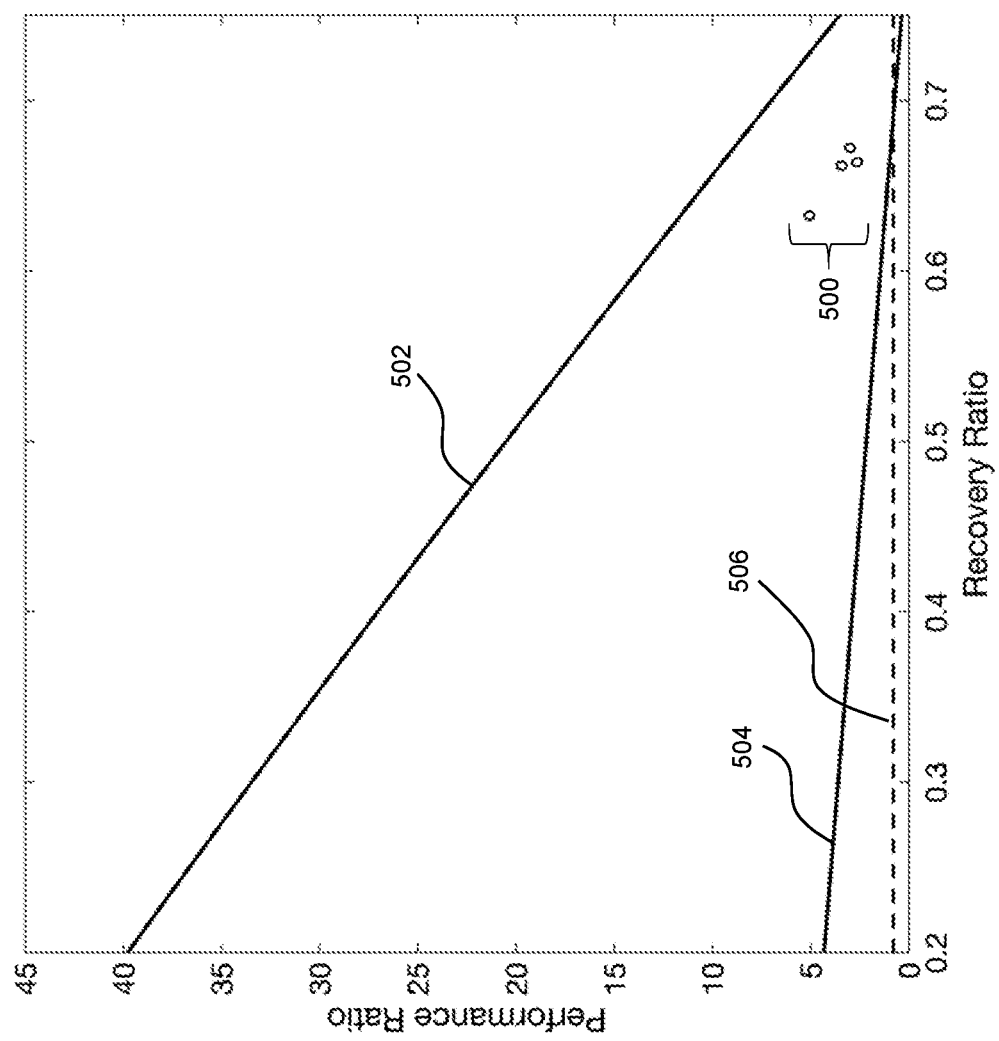
FIG. 5 is a graph of performance ratio as a function of recovery ratio corresponding to the experimental results shown in FIG. 4.

Referring now to FIG. 5, the treatment device used to carry out the four batch processes is characterized according to a performance ratio (PR) as a function of recovery ratio. As used herein, PR is defined as a ratio of latent heat of vaporization of desalinated water to the heat input used to drive the process forming the desalinated water. Thus, a PR of unity corresponds to performance of a single stage evaporator, and PR values greater than unity represent improvements relative to a single stage evaporator. For reference, the PR data 500 corresponding to the four batch processes are shown relative to a first PR curve 502 and a second PR curve 504. Specifically, the first PR curve 502 represents the performance ratio theoretically achievable under the ideal adiabatic conditions described above with respect to the first efficiency curve 402 (FIG. 4), and the second PR curve 504 represents the performance ratio theoretically resulting from the poor insulation conditions described above with respect to the second efficiency curve 404 (FIG. 4). For additional context, a third PR curve 506 is shown to represent a PR of unity associated with a single stage evaporator. Thus, as may be appreciated from FIG. 5, the PR associated with the four batch processes carried out using the treatment device represent a significant improvement relative to a single stage evaporator, represented as the third PR curve 506. However, as may additionally or alternatively be apparent from FIG. 5, the PR associated with the four batch processes carried out using the treatment device may be significantly improved through by reducing heat losses (e.g., by moving performance of the system in a direction away from the second PR curve 504 toward the first PR curve 502).

Referring now to FIGS. 3A, 3B, 3C, 4, and 5, the experimental results suggest that large thermal losses are present in the prototype treatment device used to carry out these experiments. Without wishing to be bound by theory, primary sources of thermal loss observed in the prototype treatment device include: 1) low membrane area, which contributes to longer times required to move salt-water through the membrane and, thus, an increased difference between the total heat release time and the treatment time; 2) thermal mass of the second volume of the treatment device; and 3) frictional loss associated with sliding the actuator to translate pressure from the second volume to the feed liquid in the first volume. These sources of thermal loss suggest features that may be additionally or alternatively incorporated into the treatment device to achieve more efficient operation. Some of these features are set forth in certain implementations in the description that follows.

While certain implementations have been described, other implementations are additionally or alternatively possible.

Figure 6:
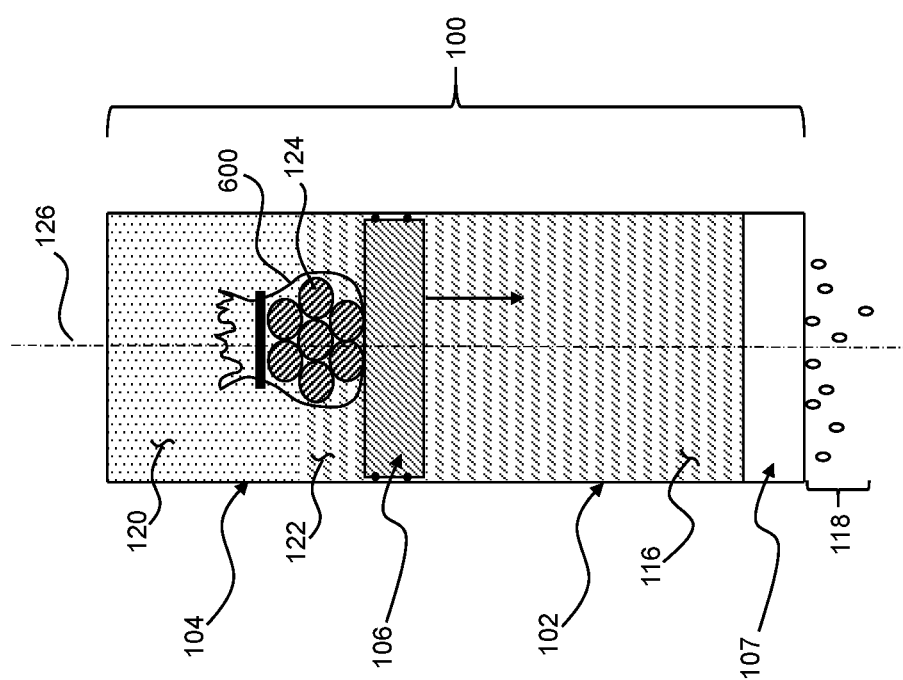
FIG. 6 is a cross-section side view of the treatment device of FIG. 1B, with a first reactant separated from a second reactant by a container in the second volume.

For example, while certain approaches to controlling the rate of reaction of reactants in the second volume have been described, other approaches are additionally or alternatively possible. For example, referring now to FIG. 6, the second reactant 124 may be placed in a container 600, which may be permeable to the first reactant 122. The container may be any one or more of various different types of porous structures, such as a bag formed of a woven or nonwoven material, through which the first reactant 122 may diffuse over time. Further, or instead, the container 600 may generally withstand pressure increase of the gas 120 during use such that structural integrity of the container 600 remains intact over the course of a treatment process.

As compared to introducing the first reactant 122 and the second reactant 124 directly to one another, the container 600 may increase the total heat release time by introducing a physical delay to the exposure of the second reactant 124 to the first reactant 122. That is, returning to the example of the container 600 as a porous structure, the first reactant 122 may move slowly through the container 600 and into contact with the second reactant 124 such that the total heat release time becomes limited by the time required for all of the second reactant 124 to become exposed to the first reactant 122. More generally, the container 600 may facilitate achieving longer total heat release times that are closer to the total treatment time. As discussed above, under otherwise identical conditions, such longer heat release times may facilitate achieving improved efficiency in treating the feed liquid 116 using the treatment device 100.

While physical delay in the interaction between reactants has been described as being useful for achieving improved efficiency of a treatment device, other approaches to achieving improved efficiency are additionally or alternatively possible. For example, referring now to FIG. 7, a treatment device 700 may include an actuator 706. As described in greater detail below, the actuator 706 may include a phase-change material 734 to facilitate converting additional thermal energy from an exothermic reaction into mechanical work during operation of the treatment device 700. For the sake of clear and efficient description, elements of the treatment device 700 should be understood to be analogous to and/or interchangeable with elements with corresponding 100-series element numbers (FIGS. 1A, 1B, and 1C) described herein, and therefore are not described separately from counterpart 100-series elements, except to note differences or emphasize certain features. Thus, for example, the treatment device 700 may include a membrane 707 that should be understood to be analogous to the membrane 107 (FIGS. 1A, 1B, and 1C). Further, or instead, the treatment device 700 may be operated using any one or more of the reactants described herein as part of any one or more of the treatments described herein.

The treatment device 700 may include a first chamber 702 and a second chamber 704, and the actuator 706 may be disposed between the first chamber 702 and the second chamber 704. For example, the first chamber 702 and a first section 708 of the actuator 706 may define a first volume 710. Additionally, or alternatively, the second chamber 704 and a second section 712 of the actuator 706 may define a second volume 714. The actuator 706 may be movable to transfer pressure from the second volume 714 into mechanical work exerted on a feed liquid in the first volume 710 according any one or more of the various different techniques described herein.

In certain implementations, the actuator 706 may define a third volume 733 between the first section 708 and the second section 712 of the actuator 706. The first section 708 and the second section 712 may be movable, collectively, in a direction toward the first volume 710 through overall movement of the actuator 706 in response to pressure in the second volume 714. Additionally, or alternatively, the first section 708 of the actuator 706 may be a piston movable relative to the second section 712 of the actuator 706 in response to an increase in pressure in the third volume 733, as described in greater detail below.

The third volume 733 may be fluidically isolated from each of the first volume 710 and the second volume 714 and, more generally, may be a closed volume. The second section 712 of the actuator 706 may be more thermally conductive than the first section 708 of the actuator 706 such that the third volume 733 may be substantially thermally isolated from the first volume 710 while being in thermal communication with the second volume 714. Thus, at least a portion of the heat generated in the second volume 714 (e.g., through any one or more of the exothermic reactions described herein) may be conducted into the third volume 733. As described in greater detail below, this may facilitate maintaining a peak temperature in the second volume 714 below a threshold temperature associated with safe use of the treatment device 700 while still harnessing at least a portion of the energy from excess heat generated in the second volume 714.

A phase-change material 734 may be stored in the third volume 733. The phase-change material 734 may be any one or more of various different types of materials that may absorb heat introduced into the third volume 733 via the second section 712 of the actuator 706 as heat is generated in the second volume 714 according to any one or more of the various different heat generation techniques described herein. That is, the phase-change material 734 may facilitate storing energy in a phase change. In general, the phase-change material 734 may be any one or more of various different liquids and/or solids that undergo a phase change to a vapor within a suitable temperature range associated with operation of the treatment device 700. Thus, in some implementations, the composition of the phase-change material 734 may be specifically tuned for a given temperature range useful in a given treatment device 700.

In use, pressure in the second volume 714 may be generated according to any one or more of various different exothermic reactions described herein. The resulting increase in pressure in the second volume 714 may move the actuator 706 in an overall motion in a direction from the second volume 714 toward the first volume 710. At least some of the heat associated with pressure generation in the second volume 714 may be conducted into the third volume 733 via the second section 712 of the actuator 706. In the third volume 733, the heat received from the second volume 714 may cause the phase-change material 734 to vaporize, increasing the amount of vapor in the third volume 733. The increase in the amount of vapor in the third volume 733, in turn, may increase pressure the third volume 733 to expand. Because the pressure in the second volume 714 is larger than the pressure in the third volume 733, the expansion of the third volume 733 occurs in a direction toward the first volume 710. That is, the first section 708 of the actuator 706 moves away from the second section 712 of the actuator 706, in a direction toward the first volume 710. In this way, the phase-change material 734 may facilitate recovering at least some of the energy loss that may otherwise occur in use cases associated with a peak temperature limitation. Further, or instead, even in use cases in which temperature limitations are not a significant concern, the pressure increase associated with the phase-change material 734 may advantageously change the pressure profile exerted on the first volume 710 such that pressure is exerted on the first volume 710 over a longer period of time, such as may be useful for achieving more efficient use of fuel (e.g., as described above with respect to FIGS. 3A, 3B, and 3C.

Figure 7:
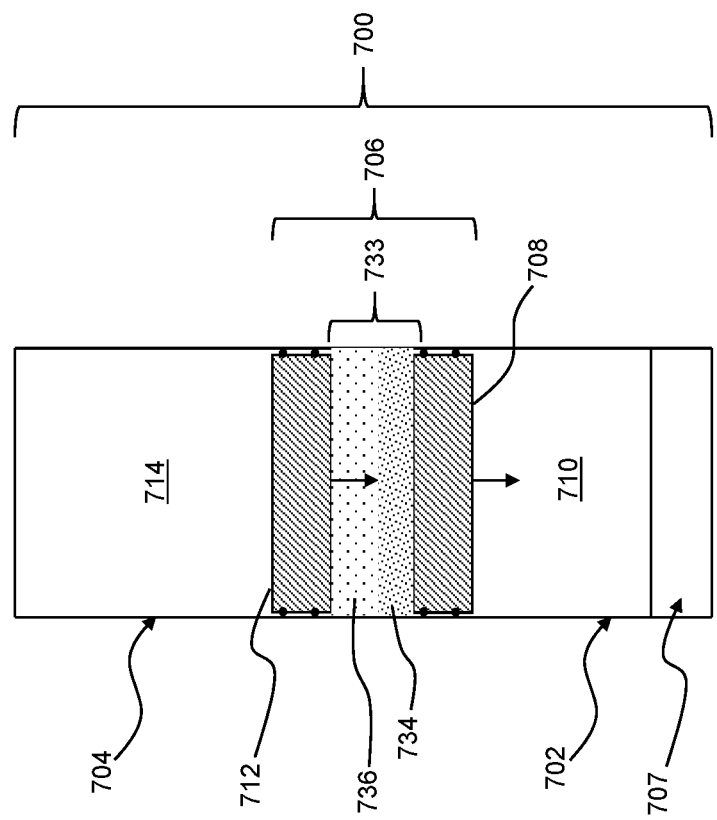
FIG. 7 is a schematic representation of a treatment device including an actuator defining a volume containing a phase-change material.
Figure 8:
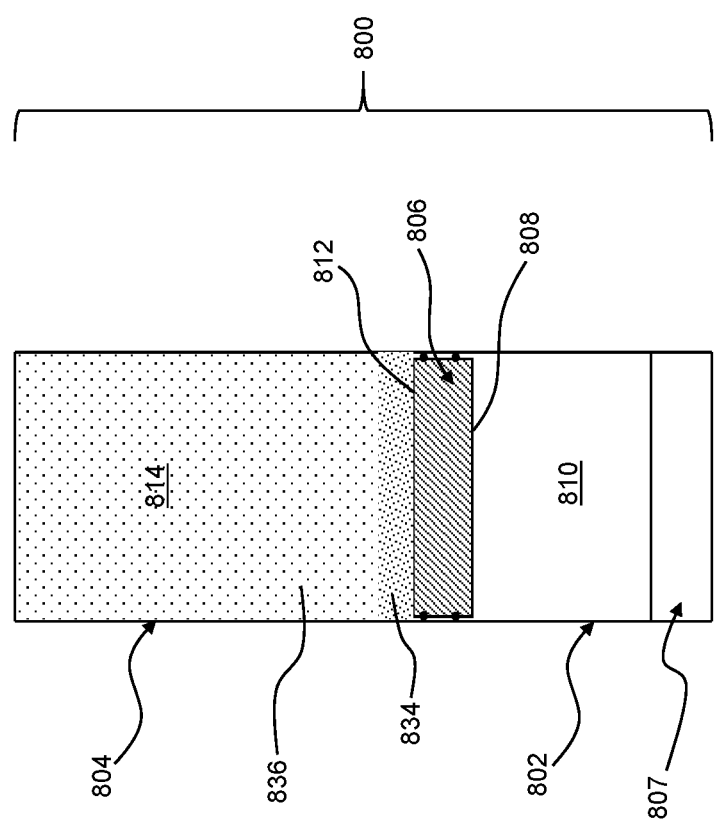
FIG. 8 is a schematic representation of a treatment device including an actuator driven by solar energy.

While pressure in the second volume of a treatment device has been described as being generated through an exothermic reaction that generates a pressure increase due an increase in heat as well as an increase in the amount of vapor, other approaches to pressure generation in the second volume of the treatment device are additionally or alternatively possible. For example, referring now to FIG. 8, a treatment device 800 may generate pressure using solar energy to drive treatment of a treatment liquid. For the sake of clear and efficient description, elements of the treatment device 800 should be understood to be analogous to and/or interchangeable with elements with corresponding 100-series element numbers (FIGS. 1A, 1B, and 1C) or the corresponding 700-series element numbers (FIG. 7) described herein, and therefore are not described separately from counterpart 100-series elements and/or counterpart 700-series elements, except to note differences or emphasize certain features. Thus, for example, the treatment device 800 may include a membrane 807 that should be understood to be analogous to the membrane 107 (FIGS. 1A, 1B, and 1C) and/or membrane 707 (FIG. 7).

The treatment device 800 may include a first chamber 802, a second chamber 804, and an actuator 806. The first chamber 802 and a first section 808 of the actuator 806 may define a first volume 810, and the second chamber 804 and a second section 812 of the actuator 806 may define a second volume 814. The second volume 814 may be a closed volume such that an increase in pressure in the second volume 814 may exert pressure on the second section 812 of the actuator 806 to move the actuator 806 in such that a pressure increase in the second volume 814 is transferred into mechanical work exerted on the feed liquid by the first section 808 in the first volume 810. In turn, the mechanical work exerted on the feed liquid may move the feed liquid through the membrane 807.

A phase-change material 834 may be disposed in the second volume 814. The phase-change material 834 may be any one or more of various different liquids and/or solids that may be vaporized through the introduction of heat into the second volume 814. In general, composition of the phase-change material 834 may be tuned to produce a target vapor pressure in the second volume 814 upon exposure to a given amount of heat associated with a given use case. As an example, the phase-change material 834 may include aqueous ammonia. Continuing with this example, the phase-change material 834 may be tuned for a given use case by changing the concentration of ammonia in the aqueous ammonia.

In use, solar energy—in the form of heat absorbed by the second chamber 804—may be directed to the phase-change material 834 in the second volume 814. For example, at least a portion of the second chamber 804 may be formed of an opaque material that may absorb heat from sunlight in an environment external to the second chamber 804. As a specific example, the opaque material exposed to the environment external to the second chamber 804 may be a dark color to facilitate directing solar energy into the second volume 814.

As the phase-change material 834 in the second volume 814 is heated by the solar energy, the phase-change material 834 may vaporize (e.g., in a phase change from liquid to vapor) to form a vapor 836 in the second volume 814. Formation of the vapor 836 may increase pressure in the second volume 814 to move the actuator 806 such that the feed liquid in the first volume 810 moves through the membrane 807.

In general, composition of the phase-change material 834 may be tuned based on, among other things, the amount of sunlight present or expected for a given use case of the treatment device 800. For example, under low sunlight conditions, the phase-change material 834 may be tuned to have a low vapor pressure to facilitate evaporating the phase-change material 834 to produce pressure in the second volume 814 more easily. Additionally, or alternatively, under direct sunlight conditions, the vapor pressure of the phase-change material 834 may be tuned to a high vapor pressure. As an example, the high vapor pressure may be well above the osmotic pressure of the feed liquid in the first volume 810 to facilitate moving the feed liquid through the membrane 807 at an increased rate.

As may be appreciated from the foregoing, the treatment device 800 may be reset by moving the actuator 806 to a starting position once the temperature in the second volume 814 is sufficiently low, and a subsequent batch process may then be initiated. This may be repeated over multiple batches. This self-contained nature of the treatment device 800 may offer significant advantages relative to implementations based on the use of exothermic reactions to create pressure. For example, as compared to implementations requiring reactants for an exothermic reaction, the treatment device 800 may be operated without constraints associated with providing and storing a consumable fuel source suitable for multiple batch treatments of the feed liquid. Additionally, or alternatively, as compared to implementations producing reaction products, the treatment device 800 may be operated without the need for waste management.

As another example, treatment devices have been described herein as including an actuator movable toward a membrane along an axis defined by a first volume. While such movement of the actuator toward the membrane may facilitate forming treatment devices in compact form factors useful in many applications, other types of movement of the actuator relative to the membrane are additionally or alternatively possible. That is, more generally, the actuator of any one or more of the various different treatment devices described herein may be in hydraulic communication with the first volume such that movement of the actuator may be in any direction relative to the membrane of a given treatment device. Such non-linear orientations of an axis of movement of the actuator relative to the membrane may be useful, for example, for forming a given treatment device in a shape useful for a given implementation The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the devices, systems, and methods described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method of treating a feed liquid, the method comprising:
   directing the feed liquid into a first volume defined by a first chamber and a first section of an actuator;
   increasing pressure of a gas in a second volume defined by a second chamber and a second section of the actuator, the increase in pressure of the gas in the second volume moving the second section to increase a size of the second volume, wherein increasing pressure of the gas in the second volume comprises forming the gas in an exothermic reaction of reactants in the second volume, and wherein the reactants include water and a metal; and
   translating, via the actuator, the increase in the second volume into movement of the first section, the movement of the first section decreasing the first volume to move the feed liquid through a membrane of the first chamber to form a permeate.

2. The method of claim 1, wherein a first volumetric concentration of salt in the feed liquid in the first volume is greater than a second volumetric concentration of salt in the permeate.

3. The method of claim 1, wherein a total of the first volume and the second volume is constant as the first volume decreases and the second volume increases.

4. The method of claim 1, wherein increasing pressure of the gas in the second volume includes heating the gas in the second volume.

5. The method of claim 1, wherein formation of the gas in the exothermic reaction of the reactants in the second volume has a total heat release time, movement of the feed liquid through the membrane of the first chamber to form the permeate has a desalination time, and a difference between the desalination time and the total heat release time is less than about 50 percent of the desalination time.

6. The method of claim 1, wherein the metal includes aluminum, and forming the gas in the exothermic reaction includes reacting the water and the aluminum in the presence of gallium.

7. The method of claim 6, wherein the gas formed in the exothermic reaction of the reactants in the second volume includes hydrogen in a concentration above an upper explosion limit of hydrogen.

8. The method of claim 4, wherein heating the gas in the second volume further includes forming the gas through a phase change of a liquid in the second volume.

9. The method of claim 8, wherein heating the gas in the second volume includes directing solar energy to the liquid in the second volume.

10. The method of claim 9, wherein the liquid includes aqueous ammonia.

11. The method of claim 1, further comprising flushing the second volume with an inert gas.

12. The method of claim 1, further comprising pumping air from the second volume to form a partial vacuum.

13. A treatment device comprising:
   a first chamber including a membrane;
   a second chamber; and
   an actuator having a first section and a second section, the first section and the first chamber defining a first volume, the second section and the second chamber defining a second volume fluidically isolated from the first volume, the second section of the actuator movable relative to the second chamber to increase the second volume, and the first section of the actuator movable relative to the first chamber to decrease the first volume, in response to the increase in the second volume, to move a feed liquid from the first volume through the membrane to form a permeate, wherein the second volume comprises reactants comprising water and a metal.

14. The treatment device of claim 13, wherein a total of the first volume and the second volume is constant as the first section and the second section of the actuator move.

15. The treatment device of claim 13, further comprising aqueous ammonia in the second volume.

16. The treatment device of claim 13, wherein the first section of the actuator is a piston movable relative to the second section of the actuator.

17. The treatment device of claim 16, wherein the actuator defines a third volume between the piston and the second section, the piston having a first thermal conductivity, the second section having a second thermal conductivity greater than the first thermal conductivity, and the third volume in thermal communication with the second section of the actuator.

18. The treatment device of claim 17, further comprising aqueous ammonia in the third volume.

\* \* \* \* \*